(12) United States Patent
Freiberg et al.

(10) Patent No.: US 6,788,657 B1
(45) Date of Patent: Sep. 7, 2004

(54) UNIVERSAL MOBILE TELEPHONE SYSTEM NETWORK WITH IMPROVED RATE MATCHING METHOD

(75) Inventors: Lorenz Fred Freiberg, Wiltshire (GB); Jens Muechkenheim, Nuremberg (DE)

(73) Assignee: Lucent Technologies, Inc., Murray Hill, NJ (US)

(*) Notice: Subject to any disclaimer, the term of this patent is extended or adjusted under 35 U.S.C. 154(b) by 932 days.

(21) Appl. No.: 09/611,010

(22) Filed: Jul. 6, 2000

(30) Foreign Application Priority Data

Jul. 12, 1999 (EP) .......................................... 99305516

(51) Int. Cl.$^7$ ................................................ H04Q 7/00
(52) U.S. Cl. ..................................................... 370/328
(58) Field of Search ................................ 370/378, 341, 370/342, 343, 322, 347, 348, 229, 230, 231, 232, 233, 234, 235, 236, 465, 252

(56) References Cited

U.S. PATENT DOCUMENTS

| | | | |
|---|---|---|---|
| 5,309,474 A | 5/1994 | Gilhousen et al. | 375/1 |
| 5,490,136 A * | 2/1996 | Sereno et al. | 370/342 |
| 5,581,575 A | 12/1996 | Zehavi et al. | 375/200 |
| 5,822,318 A | 10/1998 | Tiedemann, Jr. et al. | 370/391 |
| 5,909,434 A | 6/1999 | Odenwalder et al. | 370/342 |
| 6,181,683 B1 * | 1/2001 | Chevillat et al. | 370/329 |
| 6,347,091 B1 * | 2/2002 | Wallentin et al. | 370/437 |
| 6,374,112 B1 * | 4/2002 | Widegren et al. | 455/452.2 |
| 6,438,370 B1 * | 8/2002 | Einola et al. | 455/422.1 |
| 6,456,607 B2 * | 9/2002 | Arai et al. | 370/335 |
| 6,501,748 B1 * | 12/2002 | Belaiche | 370/342 |
| 6,501,953 B1 * | 12/2002 | Braun et al. | 455/436 |
| 6,507,567 B1 * | 1/2003 | Willars | 370/321 |
| 6,577,669 B2 * | 6/2003 | Shin et al. | 375/130 |
| 6,594,238 B1 * | 7/2003 | Wallentin et al. | 370/252 |
| 6,680,932 B1 * | 1/2004 | Hsuan et al. | 370/350 |
| 6,697,986 B2 * | 2/2004 | Kim et al. | 714/751 |
| 6,697,988 B2 * | 2/2004 | Kim et al. | 714/752 |

FOREIGN PATENT DOCUMENTS

EP 0 627 827 A2 5/1994 ............ H04B/7/26

OTHER PUBLICATIONS

Berruto, E., et al., "Variable–Rate For The Basic Speech Service In UMTS", "Proceedings of the Vehicular Technology Conference" New York, NY, USA, IEEE 1993, vol. CONF. 43 pp. 520–523.
Frenger, P. et al., "Rate Matching In Multichannel Systems Using RCPC–Codes" "IEEE Vehicular Technology Conference" New York, NY USA, vol. CONF. 47, pp. 354–357.
European Search Preort, dated Jan. 12, 2000.

* cited by examiner

Primary Examiner—Douglas Olms
Assistant Examiner—Ricardo M. Pizzarno

(57) ABSTRACT

In a UMTS network in which a single user can transmit or receive a number of services having different transmission power requirements over a single channel, a method of determining for each service the number of bits to be punctured or repeated to provide rate matching by the steps of deriving for each service the Energy per Bit per Noise density $E_B/N_O$ required to achieve a desired Bit Error Rate; from each $E_B/M_O$ deriving a value of the Energy per coded Symbol per Noise density $E_S/N_O$; and from $E_S/N_O$ deriving a rate matching factor by which that $E_S/N_O$ can be matched to the minimum Energy per coded Symbol per Noise density applicable to the channel in which to the services are multiplexed. The values of $E_B/N_O$ are stored in a look up table in the BTS and each mobile; the BSC generates values of semi static rate matching factors and spreading factors for each service and transmits them to the BTS and mobiles so that the mobile can calculate from the received values and the values stored in the look up table the number of bits to be punctured or repeated.

10 Claims, 3 Drawing Sheets

ACCURATE UNIVERSAL MOBILE TELEPHONE SYSTEM NETWORK WITH IMPROVED RATE MATCHING METHOD

CROSS-REFERENCE TO RELATED APPLICATION

This application claims priority of European Patent Application No. 99305516.9, which was filed on Jul. 12, 1999.

BACKGROUND OF THE INVENTION

1. Field of the Invention

This invention relates to a Universal Mobile Telephone System (UMTS) network and more especially to a method of calculating the number of bits to be punctured or repeated to achieve effective rate matching.

2. Description of the Prior Art

In a UMTS system, the technique of time multiplexing is used to combine different services required by one user. The services have different Quality of Service (QoS) requirements, such as signal power with respect to noise and interference power, and latency restrictions which lead to different requirements of transmission power; transmission power must therefore be adjusted so that in any one transmission channel the QoS is maintained for the service making the highest demand, but simultaneously transmission power is minimised.

To achieve this, and also to adapt the symbol data rate to the physical channel data rate, the method of rate matching is used, ie, some bits are punctured or repeated. The principle of rate matching is described by the Ericsson company in the paper "Description of Rate Matching in UTRA/FDD," TDoc SMG2 UMTS L1 235/98 and by the Nokia company in the paper "Mapping Rule for semi static rate matching," TDoc SMG2 UMTS L1 476/98. The publication by Nokia also proposes a method of deriving the number of bits to be punctured or repeated to achieve the required QoS for two different services by interpolation methods. However, interpolation cannot be applied to more than two services, which is a substantial limitation on the network and also the algorithm is complex.

SUMMARY OF THE INVENTION

According to the invention, in a UMTS network in which a plurality of services of a single user having different transmission power requirements are multiplexed in one channel and the technique of rate matching is applied, a method of determining for each service the number of bits to be punctured or repeated characterised by the steps of deriving for each service the Energy per Bit per Noise density $E_B/N_O$ required to achieve a desired Bit Error Rate;

from each $E_B/N_O$ deriving a value of the Energy per coded Symbol per Noise density $E_S/N_O$;

and from $E_S/N_O$ deriving a rate matching factor by which that $E_S/N_O$ can be matched to the minimum Energy per coded Symbol per Noise density applicable to said one channel.

BRIEF DESCRIPTION OF THE DRAWINGS

The invention will now be described by way of example only with reference to the accompanying drawings in which.

DETAILED DESCRIPTION OF THE INVENTION

Figure 1:
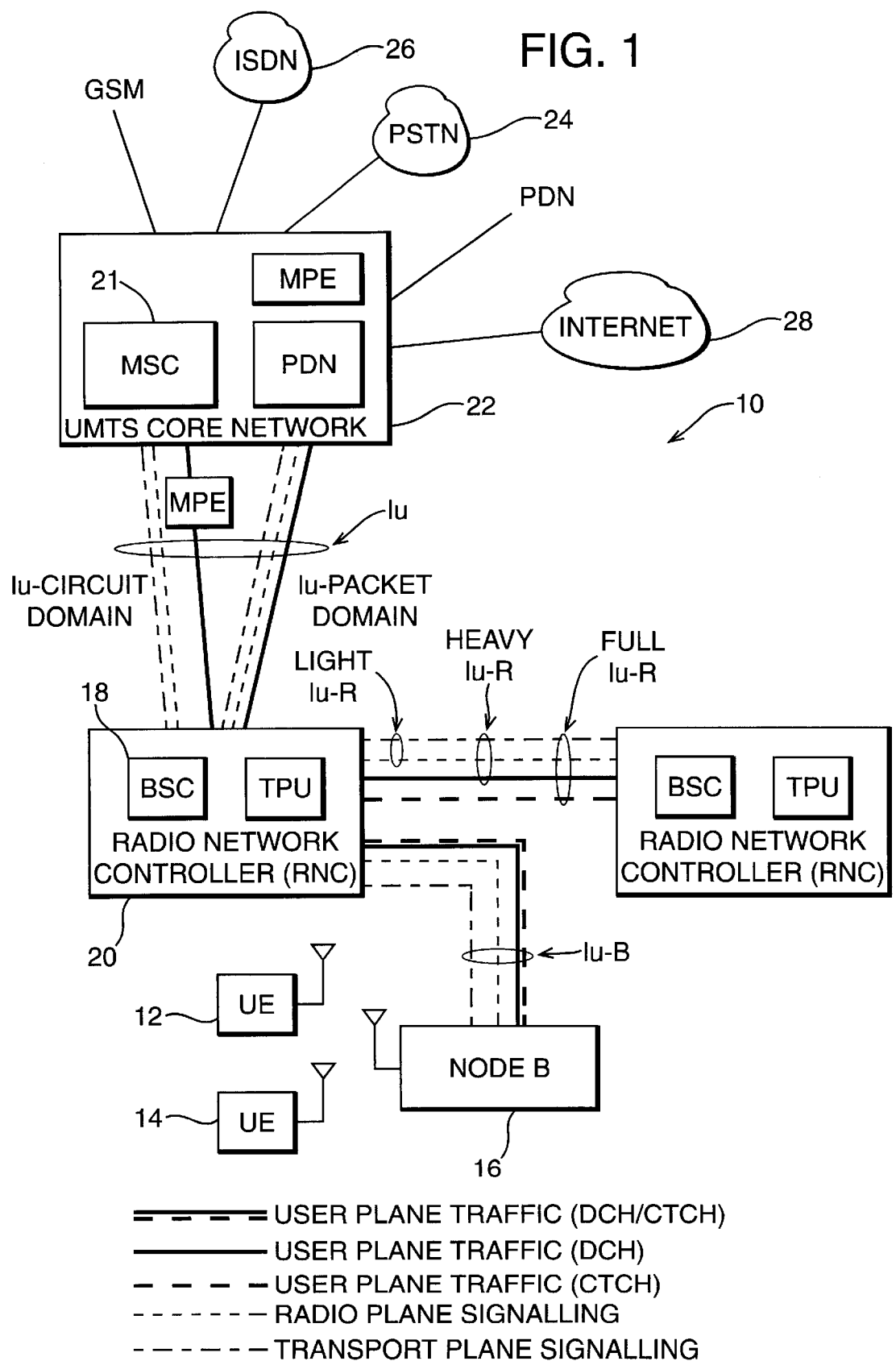
FIG. 1 is a schematic view of a UMTS network at network level.

In FIG. 1, a UMTS network 10 comprises a number of mobile users 12, 14 each connectable to a base station BTS/Node B 16. The BTS 16 is connected through a Base Station Controller BSC 18 in a Radio Network Controller (RNC) 20 to a Mobile Switching Controller (MSC) 21 in the UMTS Core Network (CN) 22. The CN 22 provides connections to the public switched telephone network PSTN 24, integrated services digital network ISDN 26 and the internet 28.

Figure 2:
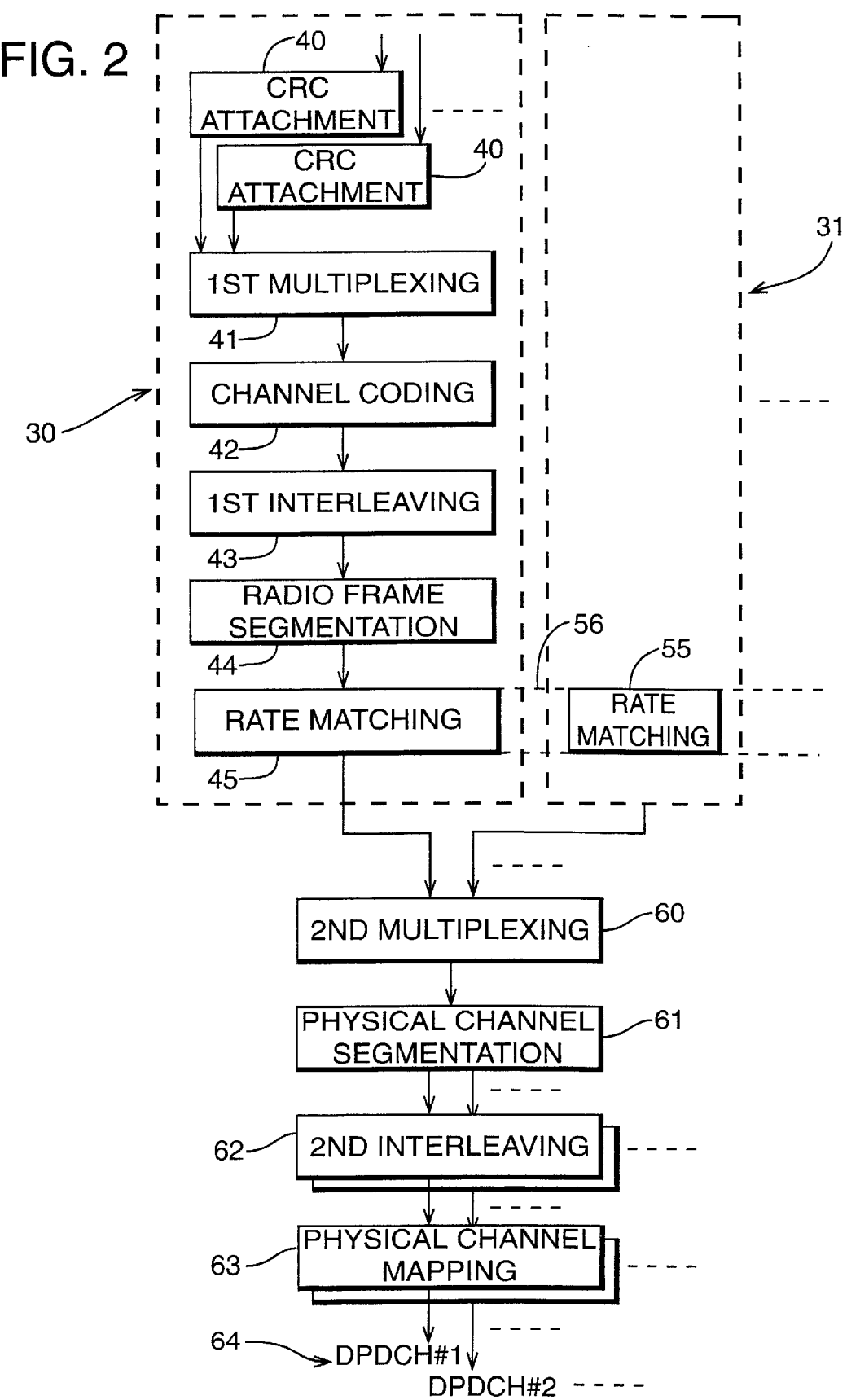
FIG. 2 shows the conventional steps in UMTS transport channel multiplexing for the uplink.

The Radio Access Network (RAN) comprises the mobile users 12, 14 and the BTS 16. To multiplex signals in the RAN in the uplink direction (from the mobile 12,14 to the BTS 16), the arrangement of FIG. 2 is used; the steps are performed in the appropriate mobile 12 or. FIG. 2 shows transport channel multiplexing for the uplink and is taken from the standard TS 25.212 V1.1.0 (1999–06).

In FIG. 2, the steps to encode services with identical QoS requirements are shown within box 30, and identical steps to encode a set of different services are performed within box 31 (steps not shown). The steps comprise Cyclic Redundancy Coding (CRC) steps 40 for identical services, (but in this invention a single service at step 40 is considered), a first multiplexing step 41, channel coding step 42, first interleaving step 43, radio frame segmentation step 44 and rate matching step 45.

The equivalent rate matching step 55 is shown in box 31.

The outputs of the two boxes 30, 31 are combined in a second multiplexing step 60 followed by a physical channel segmentation step 61, second interleaving step 62, and physical channel mapping step 63; the outputs are then provided to respective Dedicated Physical Data Channels DPDCH 64.

The reverse steps are performed for uplink de-multiplexing at the BTS 16.

This entire procedure exists also in the downlink direction, ie from the BTS 16 to a mobile 12 or 14.

While the rate matching steps 45, 55 are indicated as separate, they are in fact interrelated because rate matching is based on the relative QoS requirements of different sets of services, and because the channel must be able to support the combined rate matching output of all services, and this interrelationship is indicated at 56 but, as stated above, the interrelationship has previously been specified only for rate matching of two services by interpolation.

By application of the method of the invention, rate matching of more than two different services is achievable.

In the rate matching steps 45, 55, a set of puncturing or repetition factors is determined based on the requirements that:

a) desired transmission quality requirements of each transport channel is fulfilled and not significantly exceeded. This means that required transmission power to meet quality requirements for all transport channels is as low as possible.

b) on the uplink, the total bit rate after transport channel multiplexing is identical to the total channel bit rate of the dedicated physical channels allocated.
c) on uplink and downlink, the total allocated code resource should be minimised.
d) the puncturing factors should not exceed a certain maximum puncturing factor, specific for each transport channel.

In the current UMTS concept there are two types of rate matching specified:

(i) Semi-static Rate Matching: this is used to balance the transmission power requirements of different services, which are multiplexed to one Common Composite Traffic Channel (CCTrCH). This function is also known as 'ES/NO-balancing'—balancing the ratio of symbol energy to noise density. Because the elements related to service multiplexing are decided by the Radio Resource Control (RRC) layer, this physical layer function is controlled by RRC via the semi-static part of TFCI.

(ii) Dynamic Rate Matching: this is used in the uplink to adapt the symbol data rate to the data rate of the CCTrCH in order to preserve continuous transmission. It is an autonomous function of the physical layer. Dynamic rate matching is performed through discontinuous transmission (DTX) in the downlink.

In a single channel, several services (as indicated by boxes 30, 31) must be multiplexed which have different bit rates and different types of coding. For example a low rate video using 144 kbps and turbo coding; a voice service at 13 kbps using convolutional coding, plus signalling information, also using convolutional coding.

Each service will have a QoS requirement, and an important part of that requirement is the Energy per Bit per Noise Density $E_B/N_o$ required to achieve the desired Bit Error Rate BER. The $E_B/N_O$ for a service will apply only to specific measurement conditions, such as the environment (pedestrian, indoor, vehicular etc), the level and type of coding (turbo, conventional), the level of physical layer control signalling (Dedicated Physical Control Channel DPCCH overhead) and the spreading factor. Conventionally, the requirements have been calculated by simulation or by measurement of a service in a particular environment.

When services having different $E_B/N_O$ requirements are to be multiplexed, certain differences can be adjusted by comparing $E_B/N_O$ requirements; eg, the DPCCH consists of pilot symbols, power control and Transport Format Combination Indicator (TFCI) symbols only, with the amount of energy required being relatively independent of the service and dependent only on environment. Also, most UMTS services use rate ⅓ coding schemes with similar levels of extra overhead such as tail bits. Adjustment of power is therefore relatively easy.

Other differences cannot be derived from $E_B/N_O$ values. For example, when services are multiplexed, the Coded Composite Transport Channel CCTrCH will use a spreading factor which is different to the spreading factor that each service would use individually, and variations may be wide. A voice service normally uses a spreading factor of 128 and could be mapped onto a CCTrCH using a spreading factor of 4, when sent together with other services.

The method of the invention solves this problem.

In the invention, a look up table of $E_B/N_O$ is created; $E_B/N_O$ is expressed as Energy per coded Signal versus noise density, ie $E_S/N_O$. It must be understood that $E_B/N_O$ is not the bit energy when the data is uncoded, but is the equivalent energy per bit assuming a certain coding scheme, spreading factor and environment. Therefore for every value of $E_B/N_O$ there is a unique value $E_S/N_O$ which in this context does not include the DPCCH overhead.

Using the $E_S/N_O$ value for each service I, $(E_S/N_O)_i$, a required level of semi-stactic rate matching can be calculated. Since it is impossible for the $E_S/N_O$ for the CCTrCH to satisfy the $(E_S/N_O)_i$ rate matching is needed, such that each service achieves its desired $(E_S/N_O)_i$.

The $E_S/N_O$ for the CCTrCH is set as $E'_S/N_O$, which is likely to equal the $E_S/N_O$ for one of the constituent services; all other services are therefore forced to use semi-static rate matching. In some circumstances however the $E'_S/N_O$ does not equal the $E_S/N_O$ for a constituent service, in which case all services will be required to use rate matching. The relationship between $(E_S/N_O)_n$ and $E'_S/N_O$ is given by $$\frac{E'_S}{N_0} \cdot N_{R,i} = G(SRF_i) \cdot \left(\frac{E_S}{N_0}\right)_i \cdot N_{S,i} \quad (1)$$

Figure 3:
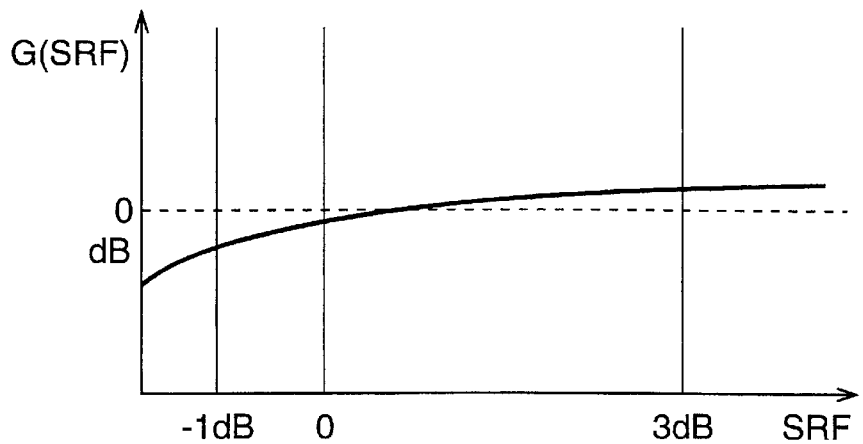
FIG. 3 shows rate matching gain.

In order to be satisfied with $E'_S/N_O$, the service must use a semi static rate matching factor, $SRF_i$, of $$SRF_i = \frac{N_{R,i}}{N_{S,i} \cdot G(SRF_i)},$$

where $N_{R,i}$ is the number of coded symbols after semi static rate matching $N_{S,i}$ is the number of code symbols before rate matching, and $G(SRF_i)$, illustrated in FIG. 3, is the coding gain associated with the level of semi-static rate matching.

Thus any service i must use a semi-static matching factor $SRF_i$.

Generally, it can be assumed that adjusting the energy by adding extra symbols is equivalent to adjusting the $E_S/N_O$. Therefore if $SRF_i$ is limited to greater than −1 dB, $G(SRF_i)$ is 1 (0 dB). However, puncturing alters the coding scheme used, which results in a loss greater than the decrease in energy. Moreover, repetition may result in extra time diversity, thereby providing coding gain beyond the increase in energy. Repeating some of the bits in a transport block may not be equivalent to increasing the energy of all of the bits. Finally, the gain achieved by repetition depends on the combining method implemented.

An additional requirements is that the semi-static rate matched transport block (on leaving box 30 or box 31 in FIG. 2) must fit into a physical channel having bits per frame $N_{Frame}$. One time frame is 10 milliseconds, and contains $N_S$ symbol bits where $$N_S = 16 \cdot \sum_{j=1}^{m} N_{dataj}$$

where m=1 for single code transmission, and m is greater than 1 for multicode transition, ie where more than one DPDCH is assigned to one CCTrCH, as in the method according to the invention.

In the uplink the number of data bits $N_{data}$ of one DPDCH in a time slot (0.625 ms) is simply given by $N_{data}=10 \cdot 2^k$, k=0 . . . 6. In the downlink, due to time multiplex of DPDCH and DPCCH it is given by $N_{data}=20 \cdot 2^k - N_{pilot} - N_{TPC} - N_{TFCI}$, k=0 . . . 6. The spreading factor of the related DPCH in uplink and downlink is $SF=256/2^k$, thus it may range from 256 down to 4. The rate matching factor $RF_i$ is given by the product of the dynamic rate matching factor DRF and the semi static rate matching factor $SFR_i$ by $RF_i=DRF \cdot SFR_i$. The dynamic rate matching factor DRF is equal for all multiplexed services, but the semi static rate matching factor SFR$_i$ depends on the service. Two basic conditions must be fulfilled by the rate matching principle:

$$\frac{E''_S}{N_0} = \left(\frac{E_S}{N_0}\right)_i \cdot \frac{1}{RF_i} \quad (2)$$

$$\sum_{i=1}^{n} N_{Ri} = \sum_{i=1}^{n} N_{Si} \cdot RF_i = DRF \cdot \sum_{i=1}^{n} N_{Si} \cdot SFR_i = N_{Total} \quad (3)$$

where $E''_S/N_O$ is the $E_S/N_O$ set point for the CCTrCH. (Through dynamic rate matching each service will achieve its individual target of $(E_S/N_O)_i$)

n is the number of services multiplexed onto the CCTrCH.

In the downlink, DRF is set to 1. Discontinuous transmission (DTX) is used instead of dynamic rate matching. DTX means that when $N_{frame} > N_{total}$, the difference in the number of bits is simply not transmitted. Hence $N_{total}$ is simply the sum of all $N_{Ri}$, as defined for semi-static rate matching. Therefore, generally $E''_S/N_O = E'_S/N_O$ in the downlink. However, if $N_{total}$ is just slightly larger than $N_{frame}$ it is possible to set DRF to between 0.8 and 1.0, thereby applying puncturing instead of DTX to adjust the CCTrCH rate. This method avoids using the next lower spreading factor and the resulting high level of repetition.

In the uplink, $N_{frame}$ must be equal to $N_{total}$, since DTX cannot be used. Therefore, DRF is defined by equations 2 and 3, as well as:

$$N_{frame} = N_{total}$$

Figure 4:
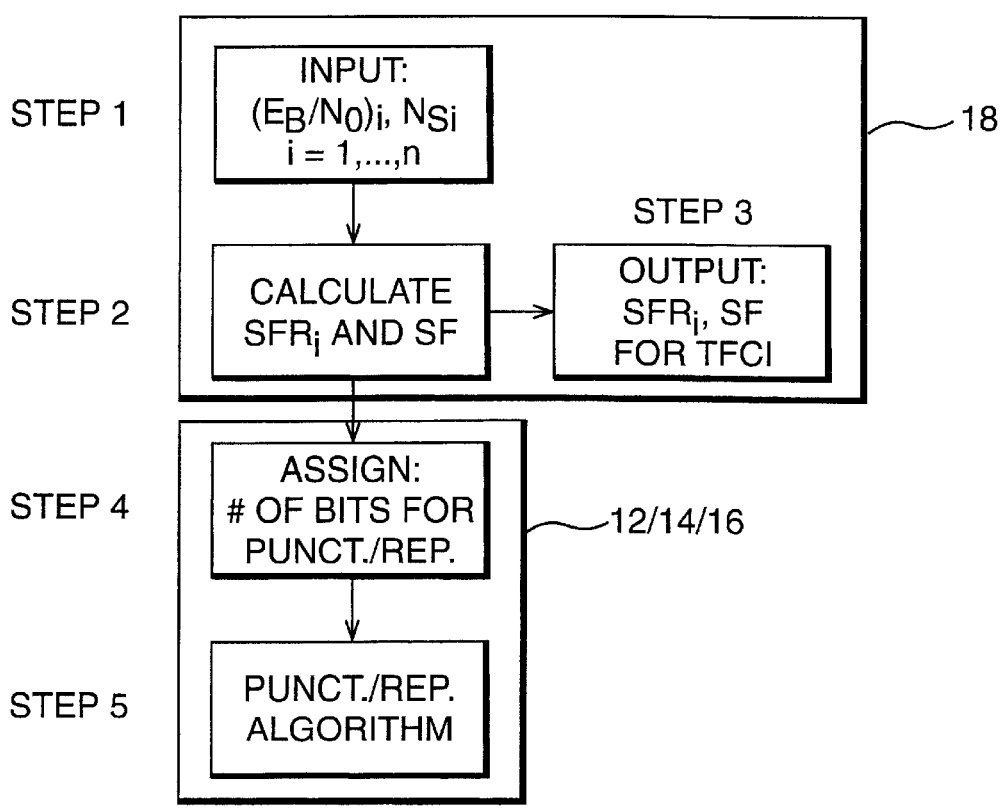
FIG. 4 shows the major steps in a first example of a method according to the invention.

FIG. 4 indicates five major steps of the method according to the invention; as indicated, steps 1, 2 and 3 are performed in the BSC (reference 18 in FIG. 2) while steps 4 and 5 are performed in the BTS 16 and mobiles 12, 14.

Step 1: In step 1, Inputs to the rate matching algorithm are the values $(E_S/N_0)_i$ which are determined for each specific service and the number of data bits which is explicitly given by the data rate $N_{Si}$.

Step 2: During this step the rate matching factors, SRF$_i$ and DRF$_i$, are calculated (equations 1 and 3). First an initial spreading factor (SF) estimate is chosen based such that $$N_{frame} > \sum_{i=1}^{n} N_{Si}.$$

Using this initial estimate for SF, the set of $(E_S/N_O)_i$ are identified from the look up table for the relevant environment and level of coding. $N_{total}$ is calculated. If $N_{frame} < 0.8 \cdot N_{total}$, the value of SF is too large and Step 2 is performed again using the new value for the spreading factor of $SF_{new} = SF/2$.

Step 3: The outputs from the RRC part of algorithm are the semi static rate matching factors for each DCH, which are element of the semi-static part of TFCI and the spreading factors for each service combination, which may be part of the dynamic part of the TFCI. The TFCI is used to inform the physical layer of both, the mobiles 12, 14 and the NodeB 16, what physical transmission parameter has to be chosen.

Step 4: This is the first step of the execution part of the rate matching algorithm. Only the TFCI is necessary to derive all other parameters for rate matching. The dynamic rate matching factor is automatically given by knowing the semi static rate matching factor for a certain service combination. An example is given in the paper by Mitsubishi Electric and Siemens: "Determination of Rate Matching Parameters for Service Multiplexing," Tdoc 3GPP TSG-RAN WG1 710/99. Now the rate matching factor for each service is calculated by RF$_i$ = DRF·SRF$_i$. From this, the number of punctured/repeated bits is simply $N_{RMi} = (RF_i - 1) \cdot N_{codi}$.

Step 5: The last step performs puncturing/repetition of the bits using the value of $N_{RMi}$. Several techniques can be applied and an example is given in the paper by Philips "Service Multiplexing," TDoc SMG2 UMTS L1 229/98.

Advantages of the method according to the invention are that the final calculation of the number of bits to be repeated or punctured, and the puncturing or repetition themselves, are carried out in the physical layer in an autonomous arrangement; that the semi-static rate matching is explicitly given; and that the method derives a spreading factor for each service combination for use by the dynamic part of the TFCI. The last two advantages are in contrast to the proposal by the Nokia company (reference above) in which the TFCI elements are not explicitly given but must be calculated separately from the number of bits.

Overall, the method of the invention leads to a significant decrease in transmitted power, and hence an improvement in overall system capacity.

EXAMPLE

In the following example, three services are multiplexed for a user in a vehicle. In the downlink a spreading factor of 4 is selected resulting in CCTrCH rate of 512 ksps. The services are as follows:

144 kbps low rate video, using turbo coding, requiring $E_S/N_O = 5$ dB. 13 kbps voice, using convolutional coding, requiring $E_S/N_O = 8$ dB. Signalling information, using convolutional coding, requiring $E_S/N_O = 9$ dB. $E'_S/N_O = 5$ dB, hence rate matching is required by each service to achieve the desired $(E_S/N_O)_i$ is:

video: 0 dB
voice: 3 dB
signalling: 4 dB.

This is shown in table 1, under the rate matching row. There is no Dynamic rate matching, Discontinuous transmission is used to match $T_{frame}$ and $T_{total}$.

TABLE 1

| Multiplexing example: Downlink. | | | |
|---|---|---|---|
| Combined Service | Voice, Low Video + Signalling | | |
| Component Services | Voice | Low Video | Signalling |
| Transport Block size | 320 | 320 | 80 |
| Transmission interval and first interleaver duration (ms) | 20 | 10 | 10 |
| Number of Transport Blocks/frame | 1 | 5 | 1 |
| Number of Bits/transmission interval | 320 | 1600 | 80 |
| Add CRC | 336 | 1680 | 96 |
| Coding Interval (ms) | 20 | 10 | 10 |
| Number of bits/coding interval | 336 | 1680 | 96 |
| Add Tail bits/Trellis Termination | 344 | 1692 | 104 |
| Convolutional Encoding | 1032 | | 312 |
| Turbo Encoding | | 5076 | |
| Rate Match factor, dB (−20% = −1 dB) | 3.01 | 0.00 | 3.98 |
| Rate Matching/Trans. Interval | 1032 | 0 | 468 |
| Add DTX indication/Trans. Interval | 2096 | 12 | 1780 |
| First interleaver size | 4160 | 5088 | 2560 |
| Interleaver check mod (1st IL/32) | 0 | 0 | 0 |

TABLE 1-continued

Multiplexing example: Downlink.

| Combined Service | Voice, Low Video + Signalling | | |
|---|---|---|---|
| Component Services | Voice | Low Video | Signalling |
| second interleaver duration (ms) | | 10 | |
| second interleaver size | | 9728 | |
| number of physical channels | | 1 | |
| Pilot bits/slot | | 16 | |
| TFCI bits per slot | | 8 | |
| TPC bits/slot | | 8 | |
| Total DPCCH field/frame | | 512 | |
| Total bits/physical channel frame | | 10240 | |
| Physical Channel rate (ksps) | | 512 | |

In the uplink a spreading factor of 4 was chosen resulting in a CCTrCH rate of 1024 ksps. The services are defined by:

144 kbps low rate video, using turbo coding, requiring $E_S/N_O=4$ dB.

13 kbps voice, using convolutional coding, requiring $E_S/N_O=7$ dB.

Signalling information, using convolutional coding, requiring $E_S/N_O=8$ dB.

If $E'_S/N_O=4$ dB, then the rate matching is required by each service to achieve the desired $(E_S/N_O)$ is:

video: 0 dB voice: 3 dB signalling: 4 dB.

This is shown in table 2, under the rate matching row. Additionally, dynamic rate matching is used to match $T_{frame}$ and $T_{total}$ resulting is a further gain due to repetition of 1.7 dB. Hence $E''_S/N_O=E'_S/N_O-1.7=2.3$ dB.

The number will vary slightly in tables 1 and 2 in order to achieve number of bits that agree with realistic interleaver size; interleaver sizes must be divisible by the number of slots.

TABLE 2

Multiplexing example: Uplink.

| Combined Service | Voice, Low Video + Signalling | | |
|---|---|---|---|
| Component Services | Voice | Low Video | Signalling |
| Transport Block size | 320 | 320 | 80 |
| Transmission interval and first interleaver duration (ms) | 20 | 10 | 10 |
| Number of Transport Blocks/frame | 1 | 5 | 1 |
| Number of Bits/transmission interval | 320 | 1600 | 80 |
| Add CRC | 336 | 1680 | 96 |
| Coding Interval (ms) | 20 | 10 | 10 |
| Number of bits/coding interval | 336 | 1680 | 96 |
| Add Tail bits/Trellis Termination | 344 | 1692 | 104 |
| Convolutional Encoding | 1032 | | 312 |
| Turbo Encoding | | 5076 | |
| Padding | 24 | 12 | 8 |
| First interleaver size | 1056 | 5088 | 320 |
| IL check: mod (1st IL per frame/16) | 0 | 0 | 0 |
| Rate Match factor, dB (−20% = −1 dB) | 4.75 | 1.69 | 5.76 |
| Rate Matching/Trans. Interval | 2052 | 2414 | 864 |
| Segmentation check: mod (Tx.Int./frame) | 0 | 0 | 0 |
| second interleaver duration (ms) | | 10 | |
| second interleaver size | | 10240 | |
| number of physical channels | | 1 | |
| DPDCH size/frame | | 10240 | |
| Physical Channel rate (ksps) | | 1024 | |
| FBI bits/slot | | 0 | |
| Pilot bits/slot | | 6 | |
| TFCI bits per slot | | 2 | |

TABLE 2-continued

Multiplexing example: Uplink.

| Combined Service | Voice, Low Video + Signalling | | |
|---|---|---|---|
| Component Services | Voice | Low Video | Signalling |
| TPC bits/slot | | 2 | |
| DPCCH size/frame | | 160 | |

Second Method

Figure 5:
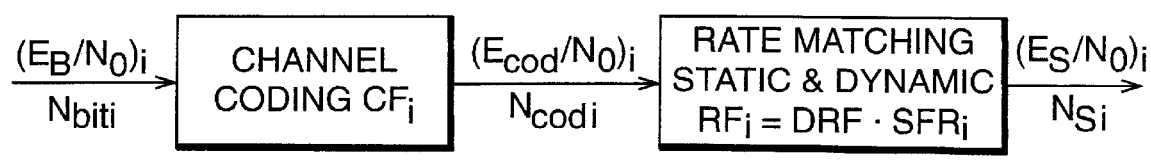
FIG. 5 shows a relationship between channel coding and rate matching in a second example of a method according to the invention.

In an alternative approach to the channel coding and rate matching required to multiplex several services, the arrangement shown in FIG. 5 is used; in a small variation to FIG. 4, the inputs at Step 1 in the BSC 18 are values of $E_b/N_O$ for each service and the number of bits in one time frame, $N_{biti}$; the current data rate is $R_B=N_{biti}\cdot 10$ ms.

$(E_B/N_O)_i$ indicates a QoS of service i which is handled by the BSC 18. After the channel coding step, which is specific to the service i and is described by the coding factor (coding gain) $CF_i$, when the number of coded bits $N_{codi}=N_{biti}\cdot CF_i$ This value is the input to a rate matching step, the output of which is $(E_S/N_O)_i$, the QoS after the coding and rate matching, and the number of symbols $N_{Si}=N_{codi}\cdot RF_i$ This second method depends on the assumption $$\left(\frac{E_B}{N_0}\right)_i \cdot N_{biti} = \left(\frac{E_{cod}}{N_0}\right)_i \cdot N_{codi} = \left(\frac{E_S}{N_0}\right)_i \cdot N_{Si} \quad (4)$$

Eq. (4) may be rewritten using the coding factor $CF_i$ and the rate matching factor $RF_i$(cf. eq.(5)). The number of repeated/punctured bits is simply given by $N_{RMi}=N_{Si}-N_{codi}=(RF_i-1)\cdot N_{codi}$. Depending on the rate matching factor $RF_i$ there are three possibilities:

Repetition: $RF_i>1$, i.e. $N_{Si}>N_{codi}$, $N_{RMi}>0$
Puncturing: $RF_i<1$, i.e. $N_{Si}<N_{codi}$, $N_{RMi}<0$
No rate matching: $RF_i=1$, i.e. $N_{Si}=N_{codi}$, $N_{RMi}=0$ The linear approximation in eq. (4) is only valid if the puncturing does not exceed a certain ratio. Currently, in ETSI there is the working assumption, that puncturing should not exceed 20%, i.e. $RF_i \geq 0.8$! The rate matching factor $RF_i$ is given by the product of the dynamic rate matching factor DRF and the semi static rate matching factor $SFR_i$ by $RF_i=DRF\cdot SFR_i$. The dynamic rate matching factor DRF is equal for all multiplexed services, and the semi static rate matching factor $SFR_i$ depends on the service. Two basic conditions must be fulfilled by the rate matching principle:

$$\left(\frac{E_S}{N_0}\right)_i = \left(\frac{E_{cod}}{N_0}\right)_i \cdot \frac{1}{RF_i} = \left(\frac{E_B}{N_0}\right)_i \cdot \frac{1}{DRF \cdot SRF_i \cdot CF_i} \approx const. \forall\ i = 1, \quad (5)$$
$$\ldots, n$$

$$\sum_{i=1}^{n} N_{Si} = \sum_{i=1}^{n} N_{codi} \cdot RF_i = DRF \cdot \sum_{i=1}^{n} N_{codi} \cdot SRF_i = N_S \quad (6)$$

The number of symbol bits in one time frame (10 ms) is derived by $$N_S = 16 \cdot \sum_{j=1}^{m} N_{dataj}.$$

The value of m>1 is used for multi-code transmission, i.e. more than one DPDCH is assigned to one CCTrCH. Single code transmission is described by m=1. In the uplink the number of data bits $N_{data}$ of one DPDCH in a time slot (0.625 ms) is simply given by $N_{data}=10 \cdot 2^k$, k=0 . . . 6. In the downlink, due to time multiplex of DPDCH and DPCCH it is given by $N_{data}=20 \cdot 2^k - N_{pilot} - N_{TPC} N_{TFCI}$, k=0 . . . 6. The spreading factor of the related DPCH in uplink and downlink is $SF=256/2^k$, thus it may range from 256 down to 4.

With this approach and referring once more to FIG. 4, after the slightly different inputs to Step 1, as explained above, Step 2 is different in that the rate matching factors are calculated as follows:

Step 2 First, the following transformation is performed (cf. eq.4): $(E_{cod}/N_0)_i = (E_B/N_0)_i / CF_i$. Then a service i=i0 with certain $(E_{cod}/N_0)_{i0}$ requirement is chosen as reference, which has a semi static rate matching factor $SRF_{i0}=1$. From this all semi static rate matching factors for the remaining services can be derived by $SRF_i = (E_{cod}/N_0)_{i0}/(E_{cod}/N_0)_i$, i≠i0. Such factors do not depend on the currently used data rates, they are a function of $E_B/N_0$-requirement and the coding method. Thus, they are part of the semi-static part of the TFCI.

Next, each service combination is taken into account. The spreading factor SF which is explicitly given by the number of symbol bits $N_S$ must be chosen for each combination of data bits $N_{biti}$ according to $$\sum_{i=1}^{n} N_{codi} \cdot SRF_i = \sum_{i=1}^{n} N_{biti} \cdot CF_i \cdot SRF_i \leq N_S / DRF_{min}$$

(cf. eq. (6), $DRF_{min} = RF_{min}/SRF_{min}$, $RF_{min}=0.8$). Because $N_S$ and hence SF depends on the currently used data rate, the spreading factor SF may be an element of the dynamic part of TFCI.

Step 3 is identical to that performed in the first method according to the invention.

Step 4 The dynamic rate matching factor is automatically given by $$DRF = N_S / \left( \sum_{i=1}^{n} N_{codi} \cdot SRF_i \right) = N_S / \left( \sum_{i=1}^{n} N_{biti} \cdot CF_i \cdot SRF_i \right)$$

for a certain service combination. Note: $N_{biti}$ is element of the dynamic part of TFCI (transport block set size), $N_S$ is given by SF and $CF_i$ comes from the used coding scheme. Now the rate matching factor for each service is calculated by $RF_i = DRF \cdot SRF_i$. From this, the number of punctured/repeated bits is simply $N_{RMi} = (RF_i - 1) \cdot N_{codi}$.

Step 5 is identical to the first method.

Example 2

In the following example of the second method according to the invention, a combination of 2 services assumed with the following parameters:

DCH$_1$: LCD data service with $E_B/N_0=5$ dB, ⅓ conv. coding +8/9 Reed Solomon (e.g. video)

DCH$_2$: UDD data service with $E_B/N_0=3$ dB, ⅓ conv. coding (e.g. packet data)

The following three service combinations are permitted: {DCH$_1$, DCH$_2$}={144/32, 64/64, 64/32} kBit/s. In table 3, the result for the semi static rate matching is shown. For illustration the values are given logarithmic in dB.

TABLE 3

Determination of the semi static rate matching factor

|  | DCH$_1$: LDD-service | DCH$_2$: UDD-service | Comments |
| --- | --- | --- | --- |
| $E_B/N_0$ | 5 dB | 3 dB |  |
| Coding factor | 5.2827 dB (27/8) | 4.7712 dB (3/1) | $CF_{dB} = 10\log_{10}(CF)$ |
| $E_{cod}/N_0$ | −0.2827 dB | −1.7712 dB | $\Delta E_{cod}/N_0 = 1.4885$ dB |
| $SRF_i$ | 1.4088 | 1 | $SRF = 10^{(\Delta E_{cod}/N_0)/10}$ |

In the current example, the service with the highest requirement on $E_{cod}/N_0$ was chosen for reference. It will be evident, that with the proposed rate matching algorithm at least this service needs no semi static rate matching. Table 4 shows the results for the dynamic part of the rate matching for the different assumed service combinations and the calculated number of bits.

TABLE 4

Dynamic Rate Matching for different Service Combinations

|  |  | DCH$_1$: LDD-service | DCH$_2$: UDD-service | Comments |
| --- | --- | --- | --- | --- |
| 144/32 | $N_{biti}$ | 1440 | 336 (16 bit MAC) | TB set size |
|  | $N_{codi}$ | 4860 | 1008 | $N_S = 10240$, SF = 4 |
|  | $N_{sixteenths}$ | 8926 | 1314 | DRF = 1.3037 |
|  | $E_S/N_0$ | −2.9230 | −2.9230 | $\Delta E_S/N_0 = 0.222$ dB |
|  | $E_S/N_0$ w/o RM | −2.7008 | −4.1893 |  |
| 64/64 | $N_{biti}$ | 640 | 772 (32 bit MAC) | TB set size |
|  | $N_{codi}$ | 2160 | 2016 | $N_S = 5120$, SF = 8 |

TABLE 4-continued

Dynamic Rate Matching for different Service Combinations

|  |  | $DCH_1$: LDD-service | $DCH_2$: UDD-service | Comments |
|---|---|---|---|---|
|  | $N_{sixteenths}$ | 3080 | 2040 | DRF = 1.0121 |
|  | $E_S/N_0$ | −1.8234 | −1.8234 | $\Delta E_S/N_0$ = 0.6556 dB |
|  | $E_S/N_0$ w/o RM | −1.1678 | −2.6563 |  |
| 64/32 | $N_{biti}$ | 640 | 336 (16 bit MAC) | TB set size |
|  | $N_{codi}$ | 2160 | 1008 | $N_S$ = 5120, SF = 8 |
|  | $N_{sixteenths}$ | 3846 | 1274 | DRF = 1.2639 |
|  | $E_S/N_0$ | −2.7883 | −2.7883 | $\Delta E_S/N_0$ = 0.4208 dB |
|  | $E_S/N_0$ w/o RM | −2.3675 | −3.8560 |  |

The number of data bits for the LDD service is simply given by its data rate i.e. $N_{bitLDD} = R_{bitLDD} \cdot 10$ ms. For the UDD service an additional MAC header for e.g. adressing purposes of 16 bits is assumed, i.e. $N_{bitUDD} = R_{bitUDD} \cdot 10$ ms+16 bit. In the example, this bit numbers are equal to the transport block set size. Because the uplink is considered, the number of available symbol bits is simply given by $N_S = 40960/SF$. The value of $\Delta E_S/N_0$ describes the improvement in $E_S/N_0$ by use of the proposed rate matching method compared to missing it. The description of the specified service combinations is as follows:

LDD144/UDD32: The sum of all coded data bits including semi static rate matching is $$\sum_{i=1}^{n} N_{codi} \cdot SRF_i = 7855, DRF_{min} = 0.8 \ (SRF_{min} = 1).$$

The next lowest symbol rate would be $N_S = 5120$, i.e. SF=8. According to eq. 6 a DRF <0.8 would be necessary. Thus, the next highest SF=4 is chosen with $N_S = 10240$. The other results can be found in table 4. Using this constellation an improvement in $E_S/N_0$ of $\Delta E_S/N_0 = 0.222$ dB can be achieved. Since the transmission power is directly related to $E_S/N_0$ this leads to a decrease of the transmission power of 0.222 dB, too.

LDD64/UDD64: Here, $$\sum_{i=1}^{n} N_{codi} \cdot SRF_i = 5059.$$

Thus, SF=8 is chosen with $N_S = 5120$. For this service combination, an improvement of $\Delta E_S/N_0 = 0.6556$ dB can be achieved.

LDD64/UDD32: For the last examined service combination $$\sum_{i=1}^{n} N_{codi} \cdot SRF_i = 4051.$$

As in the previous case SF=8 is chosen with $N_S = 5120$. Now the improvement is $\Delta E_S/N_0 = 0.4208$ dB.

The second example has many of the advantages of the first method according to the invention.

The invention claimed is:

1. In a UMTS network in which a plurality of services of a single user having different transmission power requirements are multiplexed in one channel and the technique of rate matching is applied, a method comprising the steps of:

deriving for each service the Energy per Bit per Noise density $E_B/N_O$ required to achieve a desired Bit Error Rate;

deriving for each $E_B/N_O$ a value of the Energy per coded Symbol per Noise density $E_S/N_O$; and deriving from the $E_S/N_O$ a rate matching factor by which that $E_S/N_O$ can be matched to a minimum Energy per coded Symbol per Noise density applicable to the one channel.

2. The method of claim 1 comprising the initial step of generating for each service a look up table containing the value of $E_B/N_O$ required for each spreading factor used and for a plurality of environments.

3. The method of claim 2 in which the look up table is stored in the physical layer of the UMTS.

4. The method of claim 1 further comprising deriving a semi static rate matching factor and the spreading factor for each service.

5. The method of claim 4 comprising performing derivations of said semi static rate matching factor and said spreading factor in Radio Resource Control of the UMTS; transmitting the values to the physical layer of the UMTS; and in the physical layer performing puncturing or repetition in accordance with transmitted values and the values in the look up table.

6. The method of claim 4 in which the rate matching factor is derived by generating said semi static rate matching factor for each service and multiplying the semi static rate matching factor by a dynamic rate matching factor which is equal for all services to be multiplexed.

7. The method of claim 6 in which the semi static rate matching factor is normalised by division by the coding gain associated with said factor which gain is limited to greater than −1 dB.

8. The method of claim 7 in which the semi static rate matching factor and the spreading factor for each service are derived by estimating an initial spreading factor dependent on the number of bits per frame being greater than a sum of the data rates for all services to be multiplexed; comparing an initial spreading factor with said look up table of values of $E_S/N_O$ for each service and for a plurality of environments and levels of coding to determine the appropriate set of $E_S/N_O$.

9. The method of claim 4 in which the rate matching factor is derived by setting the $E_S/N_O$ of the Coded Composite Transport Channel equal to the $E_S/N_O$ of a service times the inverse of the rate matching factor.

10. The method of claim 4 in which the rate matching factor is derived by setting the $E_S/N_O$ of a service equal to the Quality of Service after channel coding of that service times the inverse of the semi static rate matching factor.

* * * * *